(12) United States Patent
Petrov (10) Patent No.: US 11,899,214 B1
(45) Date of Patent: Feb. 13, 2024

(54) HEAD-MOUNTED DEVICE WITH VIRTUALLY SHIFTED COMPONENT LOCATIONS USING A DOUBLE-FOLDED LIGHT PATH

(71) Applicant: Apple Inc., Cupertino, CA (US)

(72) Inventor: Yury A. Petrov, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/539,921

(22) Filed: Dec. 1, 2021

Related U.S. Application Data (63) Continuation of application No. 16/460,272, filed on Jul. 2, 2019, now abandoned.

(Continued)

(51) Int. Cl.
*G02B 27/01* (2006.01)
*G06T 19/00* (2011.01)
(Continued)

(52) U.S. Cl.
CPC ..... *G02B 27/0172* (2013.01); *G02B 27/0101* (2013.01); *G06F 3/011* (2013.01);
(Continued)

(58) Field of Classification Search
CPC ...... G06F 1/1647; G06F 1/1686; G06F 3/011; G06F 3/012; G06F 3/013; H04N 5/23219; G06T 19/006; G02B 5/08; G02B 5/0808; G02B 5/0816; G02B 5/30; G02B 5/3025; G02B 5/3041; G02B 17/004; G02B 17/006; G02B 27/01; G02B 27/0101; G02B 27/017; G02B 27/0172; G02B 27/0179;
(Continued)

(56) References Cited

U.S. PATENT DOCUMENTS 5,933,279 A 8/1999 Yamazaki
6,646,811 B2 11/2003 Inoguchi
(Continued)

OTHER PUBLICATIONS

Gugenheimer et al., "FaceDisplay: Towards Asymmetric Multi-User Interaction for Nomadic Virtual Reality", CHI 2018 (Apr. 21-26, 2018), Montreal, QC, Canada.
(Continued)

*Primary Examiner* — Keith L Crawley
(74) *Attorney, Agent, or Firm* — Treyz Law Group, P.C.; G. Victor Treyz; David K. Cole (57) ABSTRACT

An electronic device such as a head-mounted device may have a user display for displaying an image to a user. The image may be displayed at an eye box after passing through a lens that is interposed between the display and the eye box. A forward-facing component such as a forward-facing camera and/or an externally viewable display may be supported in the housing. The forward-facing component may be overlapped by an optical system. The optical system may have a double-folded light path that virtually shifts the position of the forward-facing component. The optical system may have a reflective polarizer and a partially reflective mirror that are separated by a given distance. The optical system may virtually shift the forward-facing component toward the eye box by twice the given distance.

19 Claims, 4 Drawing Sheets

Related U.S. Application Data (60) Provisional application No. 62/732,993, filed on Sep. 18, 2018.

(51) Int. Cl.
  *G06F 3/01* (2006.01)
  *H04N 23/611* (2023.01)

(52) U.S. Cl.
  CPC ......... *G06T 19/006* (2013.01); *H04N 23/611* (2023.01); *G02B 2027/0138* (2013.01)

(58) Field of Classification Search
  CPC ........ G02B 27/0093; G02B 2027/0129; G02B 2027/0138
  See application file for complete search history.

(56) References Cited

U.S. PATENT DOCUMENTS

| | | | |
|---|---|---|---|
| 6,980,363 B1 | 12/2005 | Takagi et al. | |
| 8,120,717 B2 | 2/2012 | Daly | |
| 8,982,471 B1 | 3/2015 | Starner et al. | |
| 9,046,999 B1 | 6/2015 | Teller et al. | |
| 9,740,282 B1* | 8/2017 | McInerny | G06F 3/013 |
| 9,939,650 B2 | 4/2018 | Smith et al. | |
| 9,995,936 B1 | 6/2018 | Macannuco et al. | |
| 10,789,777 B1 | 9/2020 | Sheikh | |
| 10,861,240 B1 | 12/2020 | Wheelwright et al. | |
| 2004/0070839 A1 | 4/2004 | Yagi et al. | |
| 2004/0140949 A1 | 7/2004 | Takagi | |
| 2005/0068314 A1 | 3/2005 | Aso et al. | |
| 2007/0285338 A1 | 12/2007 | Yanagisawa | |
| 2011/0169928 A1 | 7/2011 | Gassel et al. | |
| 2011/0194029 A1 | 8/2011 | Herrmann et al. | |
| 2014/0266990 A1 | 9/2014 | Makino et al. | |
| 2015/0067580 A1 | 3/2015 | Um et al. | |
| 2015/0219897 A1 | 8/2015 | Mukawa et al. | |
| 2015/0253573 A1 | 9/2015 | Sako et al. | |
| 2016/0054565 A1* | 2/2016 | Izumihara | G09G 5/00 345/8 |
| 2016/0217621 A1 | 7/2016 | Raghoebardajal et al. | |
| 2016/0313790 A1 | 10/2016 | Clement et al. | |
| 2016/0327795 A1* | 11/2016 | Jarvenpaa | G02B 27/0093 |
| 2016/0341959 A1 | 11/2016 | Gibbs et al. | |
| 2017/0212352 A1 | 7/2017 | Cobb et al. | |
| 2017/0255015 A1 | 9/2017 | Geng et al. | |
| 2018/0004478 A1 | 1/2018 | Chen | |
| 2018/0096533 A1 | 4/2018 | Osman et al. | |
| 2018/0101020 A1 | 4/2018 | Gollier et al. | |
| 2018/0284539 A1* | 10/2018 | Zha | G02F 1/133555 |
| 2019/0286406 A1 | 9/2019 | Chen | |
| 2020/0012107 A1 | 1/2020 | Greenberg | |
| 2021/0231259 A1* | 7/2021 | Ma | G02B 27/01 |

OTHER PUBLICATIONS

Mai et al., "TransparentHMD: Revealing the HMD User's Face to Bystanders", 16th International Conference on Mobile and Ubiquitous Multimedia (MUM 2017), Nov. 26-29, 2017, Stuttgart, Germany.

Pohl et al., "See what I see: concepts to improve the social acceptance of HMDs," IEEE VR 2016, 2 pages (Mar. 19-23, 2016).

* cited by examiner

HEAD-MOUNTED DEVICE WITH VIRTUALLY SHIFTED COMPONENT LOCATIONS USING A DOUBLE-FOLDED LIGHT PATH

This application is a continuation of U.S. patent application Ser. No. 16/460,272, filed Jul. 2, 2019, which claims priority to U.S. provisional patent application No. 62/732,993 filed Sep. 18, 2018, which are hereby incorporated by reference herein in their entireties.

FIELD

This relates generally to electronic devices, and, more particularly, to electronic devices such as head-mounted devices.

BACKGROUND

Electronic devices such as head-mounted devices may have optical components such as displays and cameras.

It can be challenging to incorporate components such as displays and cameras into a head-mounted device. Space in a head-mounted device can be limited, making it difficult to mount components in desired locations. As a result, some components may not operate as well as desired.

SUMMARY

An electronic device such as a head-mounted device may have a user display for displaying an image to a user. The head-mounted device may have a housing with head-mounted support structures. The display and lenses may be mounted in the housing. Images from the user display may be displayed in eye boxes after passing through the lenses.

A forward-facing component such as a forward-facing camera and/or an externally viewable display may be supported on a front side of the housing. The user display and the lenses may be interposed between the forward-facing component and the eye boxes. This causes the forward-facing component to be spatially separated from the eye boxes and from the face of a user.

The forward-facing component may be overlapped by an optical system. The optical system may have a double-folded light path that virtually shifts the position of the forward-facing component. The optical system may have a reflective polarizer and a partially reflective mirror that are separated by a given distance. The optical system may virtually shift the forward-facing component toward the eye box by twice the given distance.

DETAILED DESCRIPTION

An electronic device such as a head-mounted device may be provided with head-mounted support structures that allow the electronic device to be worn on a user's head. While being worn on the user's head, a display in the electronic device may present an image for viewing by the user.

The image may include computer-generated content. The image may also include images of real-world objects captured with a forward-facing camera. An optical system with a double-folded light path may overlap the front-facing camera. The optical system may virtually shift the viewpoint of the camera so that the viewpoint coincides with eye boxes at which the user's eyes are located. This reduces motion parallax when using the front-facing camera to display real-world images on the display.

If desired, the electronic device may have a forward-facing display that is viewable by people in the vicinity of the user. The display may be display any suitable content. With one illustrative arrangement, the forward-facing display may be display real-world images of the user's face and/or may display an image of the user's face that contains computer-generated facial features (e.g., an avatar, computer-generated content overlaid on a real-world face image, etc.). An optical system with a double-folded light path may overlap the forward-facing display, so that face images that are displayed on the forward-facing display are virtually shifted to a location that lies in a common plane with the surface of the user's face and the eye boxes. This allows images on the forward-facing display to be displayed without parallax due to changes in an observer's angular orientation when viewing the image.

Figure 1:
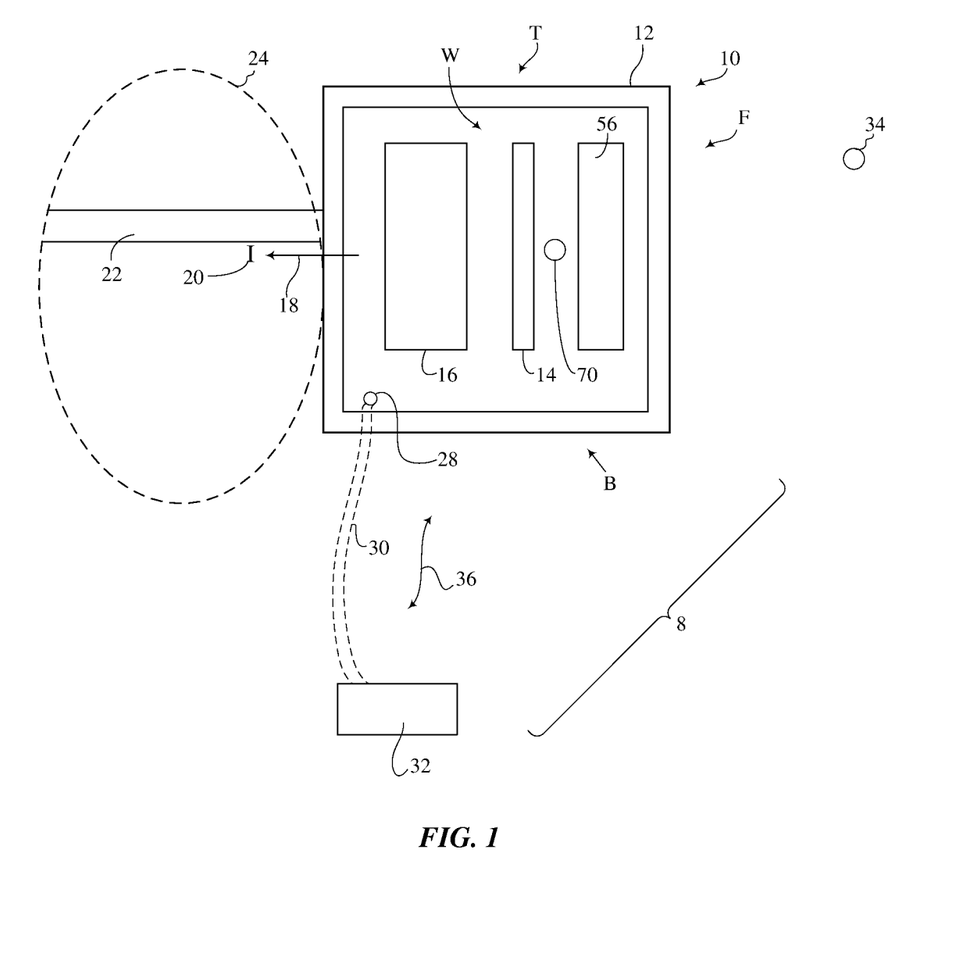
FIG. 1 is a schematic diagram of an illustrative system that includes an electronic device such as a head-mounted device and optional external electronic equipment in accordance with an embodiment.

An illustrative system of the type that may include an electronic device with an optical system having a double-folded light path is shown in FIG. 1. As shown in FIG. 1, system 8 may include electronic device such as electronic device 10 and optional external electronic equipment 32. In an illustrative configuration, electronic device 10 is a head-mounted (head-mountable) electronic device. In general, device 10 and/or external electronic equipment 32 may be any suitable electronic equipment. For example, device 10 and/or equipment 32 may be devices such as a laptop computer, a computer monitor containing an embedded computer (e.g., a desktop computer formed from a display with a desktop stand that has computer components embedded in the same housing as the display), a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device (e.g., a game console such as a set-top box or other game system), a navigation device, a tower computer, an embedded system such as a system in which electronic equipment with a display is mounted in a kiosk or automobile, equipment that implements the functionality of two or more of these devices, or other electronic equipment.

As shown in FIG. 1, electronic device 10 may have a housing such as housing 12. Housing 12 may have portions that are configured to allow device 10 to be worn on a user's head 24. For example, housing 12 may have the shape of a pair of eyeglass, a helmet, goggles, a hat, etc. and may include or be coupled to a housing structure such as a strap, eyeglass temples, helmet support structure, googles frame, and/or other head-mounted support structures such as head-mounted support structure 22. Support structure 22 may be attached to the main body portion of housing 12 using a fixed connection or a removable connection.

Housing 12 and associated support structure 22 may be formed from metal, polymer, glass, ceramic, crystalline material such as sapphire, soft materials such as fabric and foam, wood or other natural materials, other materials, and/or combinations of these materials. Housing 12 may be configured to form an enclosure and supporting structures for eyeglasses, goggles, a helmet, a hat, a visor, and/or other head-mounted electronic device.

Display 14 may be mounted in housing 12. During operation, display 14, which may sometimes be referred to as a user display, may display an image that is viewable by a user through lenses such as lens 16 (e.g., an optical system that allows the image on display 14 to be viewed by the user). Display 14 may contain a single pixel array that spans left and right lenses and/or may have separate left and right portions associated respectively with left and right lenses. Light from display 14 is directed through the lenses in direction 18 toward left and right eye boxes 20. When electronic device 10 is being worn on user's head 24, the eyes of the user will be located in left and right eye boxes 20 and the image on display 14 can be viewed by the user. If desired, left and right portions of display 14 may be mounted in movable left and right lens modules each of which includes a corresponding lens 16. The positions of these lens module structures may, if desired, be adjusted to help focus the display image and/or to accommodate a user's head (e.g., to accommodate a user's interpupillary distance).

Device 10 may also include a forward-facing camera that captures images of real-world objects such as real-world object 34 in real time. This allows captured images of real-world objects in the user's surroundings such as object 34 to be displayed for the user in real time. If desired, computer-generated content can be overlaid on the real-world images (e.g., display 14 may display both real-world content and overlaid computer-generated content). Device 10 may also be operated in a mode in which only computer-generated content is displayed.

Device 10 may have exterior surfaces that are planar, that have a curved cross-sectional profile, and/or that have other suitable shapes. In the example of FIG. 1, housing 12 has planar and/or curved surfaces on upper side T, front side F, left and right sides W, and lower side B. The exposed external surfaces on the sides of head-mounted support structure 22 may be planar and/or may be curved. In general, any suitable electronic components in device 10 may be mounted on one or more sides of device 10. As an example, a front-facing camera may be mounted in housing 12, so that the front-facing camera faces forward away from eye boxes 20 and towards real-world object 34. As another example, an externally viewable display may be mounted on front side F (e.g., so that images on the eternally viewable display are viewable by observers in the vicinity of the user wearing device 10).

In some configurations, device 10 may be a stand-alone device. In other situations, device 10 may be coupled to external equipment 32 using a wired or wireless link. As shown in FIG. 1, for example, device 10 may have a wired port such as port 28 to which a cable such as cable 30 may be coupled. Using a wired communications path such as cable 30, a wired link may be formed between device 10 and external electronic equipment 32. If desired, wireless communications circuitry may be provided in device 10 and equipment 32 to support communications between device 10 and equipment 32 over wireless communications link 36.

There may, in general, be any suitable number of external devices (equipment 32) in system 8. For example, device 10 may be a stand-alone device that operates with one or more accessory devices such as wireless controllers. As another example, device 10 may serve as an input-output accessory that interacts with a host computing device (e.g., device 10 can provide user input to equipment 32 for controlling equipment 32). The host device can optionally receive additional input from wireless controllers or other devices in system 8. During operation, a host device may supply content to device 10 for displaying to a user and/or others. The user may interact with the system by supplying input (and receiving output) using device 10 and/or using optional additional input-output devices such as wireless controllers.

Device 10 may include an optical component such as a forward-facing camera and/or a forward-facing display (sometimes referred to as an external display or externally viewable display) as shown by illustrative forward-facing optical component(s) 70. An optical system such as optical system 56 may overlap forward-facing optical component 70 (e.g., optical system 56 may overlap component 70 on front side F of device 10). Optical system 56 may have a double-folded light path that eliminates parallax associated with using optical component 70.

Figure 2:
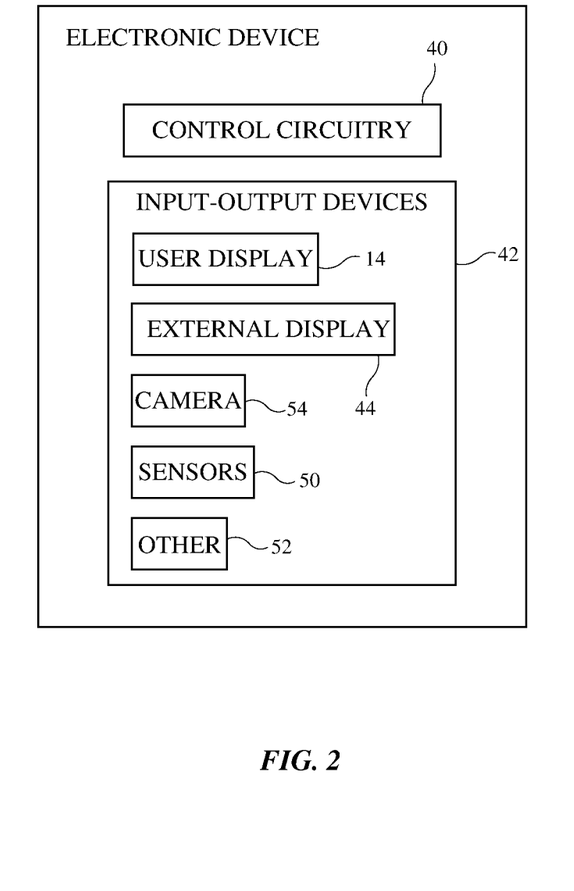
FIG. 2 is a schematic diagram of an illustrative electronic device in accordance with an embodiment.

FIG. 2 is a schematic diagram of an illustrative electronic device for system 8. As shown in FIG. 2, electronic device 10 may have control circuitry 40. Control circuitry 40 may include storage and processing circuitry for supporting the operation of device 10. The storage and processing circuitry may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 40 may be used to control the operation of device 10. For example, processing circuitry 40 may use sensors and other input-output devices to gather information and may use displays and other input-output devices to supply output. The processing circuitry may be based on one or more microprocessors, microcontrollers, digital signal processors, baseband processors, power management units, audio chips, application specific integrated circuits, etc. Control circuitry 40 may include wired and/or wireless communications circuitry (e.g., antennas and associated radio-frequency transceiver circuitry such as cellular telephone communications circuitry, wireless local area network communications circuitry, etc.). The communications circuitry of control circuitry 40 may allow device 10 to communicate with keyboards, computer mice, remote controls, wireless handheld controllers with accelerometers or other sensors, speakers, accessory displays, accessory cameras, and/or other electronic devices that serve as accessories for device 10 and/or may allow device 10 to communicate with computers, gaming systems, cellular telephones, and/or other external devices (e.g., host devices), as shown by wireless link 36 and external electronic equipment 32 of FIG. 1.

Input-output circuitry in device 10 such as input-output devices 42 may be used to allow data to be supplied to device 10 and to allow data to be provided from device 10 to external devices. Input-output devices 42 may include input devices that gather user input and other input and may include output devices that supply visual output, audible output, or other output. These devices may include buttons, joysticks, scrolling wheels, touch pads (e.g., capacitive touch sensors and/or other touch sensors), key pads, keyboards, microphones, speakers, tone generators, vibrators and other haptic output devices, light-emitting diodes and other status indicators, etc.

Input-output devices 42 may include one or more displays such as user display 14 (see, e.g., FIG. 1). User display 14 may provide images that are viewable by the user wearing device 10 when the user's eyes are located in eye boxes 20 (FIG. 1). Input-output devices 42 may also have one or more forward-facing optical components (e.g., optical component 70 of FIG. 1) such as external display 44 and/or forward-facing camera 54.

Display 14 and/or display 44 may, for example, be displays such as an organic light-emitting diode (OLED) display with an array of thin-film organic light-emitting diode pixels, a liquid crystal display with an array of liquid crystal display pixels and an optional backlight unit, a display having an array of pixels formed from respective crystalline light-emitting diodes each of which has a respective crystalline semiconductor light-emitting diode die (sometimes referred to as microLEDs or μLEDs), a display based on a digital micromirror device or other microelectromechanical systems device (e.g., a scanning mirror), a liquid-crystal-on-silicon display, and/or other displays. Camera 54 may be a color camera that captures real-world images of the environment surrounding the user (see, e.g., real-world object 34 of FIG. 1).

Input-output devices 42 may include sensors 50. Sensors 50 may be mounted on external surfaces of device 10, may operate through windows or other portions of the housing for device 10, and/or may be mounted in one or more interior regions of device 10.

Sensors 50 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor overlapping a display, and/or a touch sensor that forms a button, trackpad or other two-dimensional touch sensor, or other input device not associated with a display), and other sensors. If desired, sensors 50 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, visual odometry sensors based on image sensors, and/or other sensors. In some arrangements, device 10 may use sensors 50 and/or other input-output devices to gather user input (e.g., buttons may be used to gather button press input, touch sensors overlapping displays can be used for gathering user touch screen input, touch pads may be used in gathering touch input, microphones may be used for gathering audio input, etc.).

If desired, electronic device 10 may include additional components 52. Components 52 may include haptic output devices, audio output devices such as speakers, light sources such as light-emitting diodes (e.g., crystalline semiconductor light-emitting diodes for status indicators and/or components), other optical output devices, and/or other circuitry for gathering input and/or providing output. Device 10 may also include an optional battery or other energy storage device, connector ports such as port 28 of FIG. 1 for supporting wired communications with ancillary equipment and for receiving wired power, and other circuitry.

Figure 3:
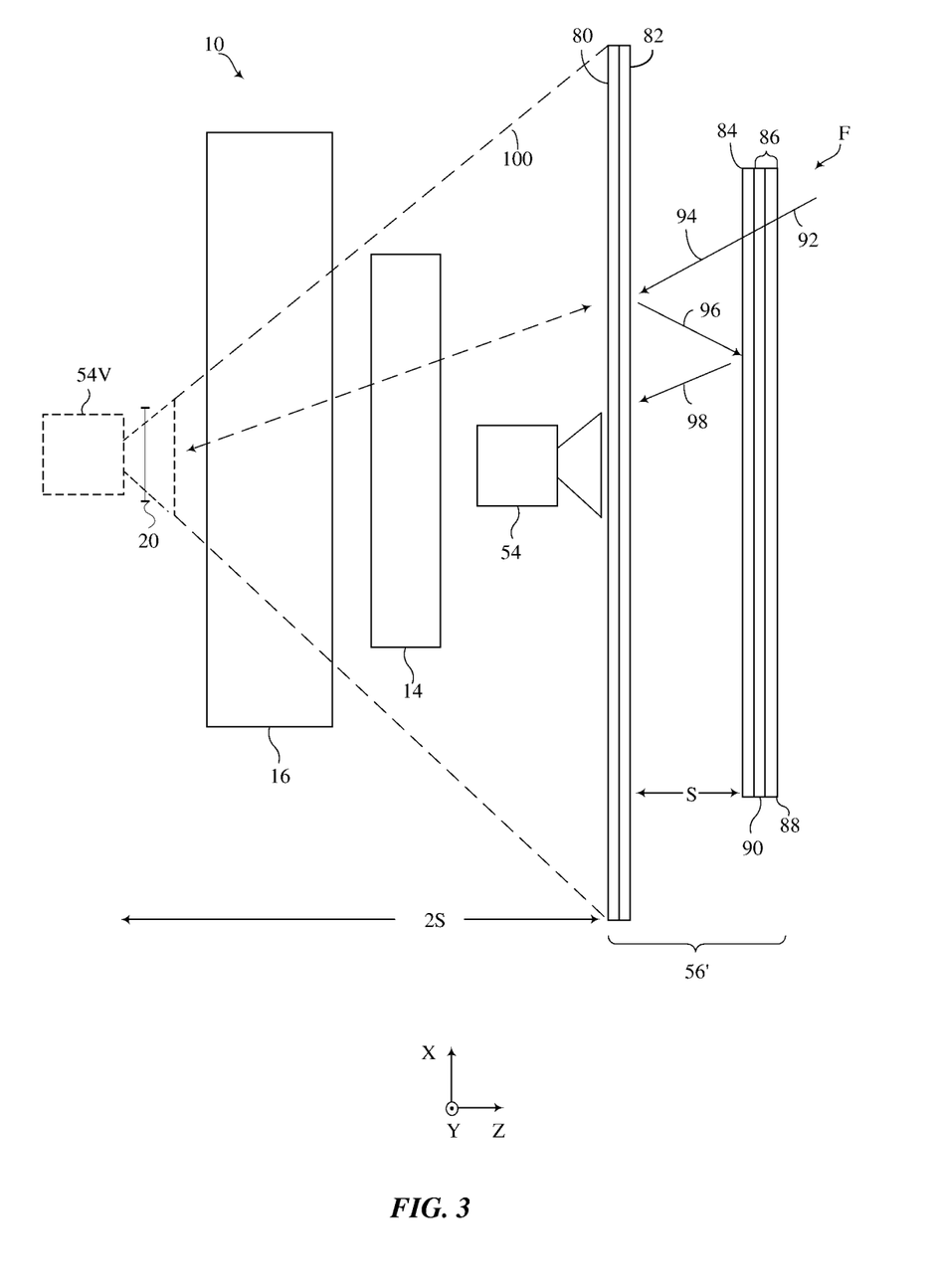
FIG. 3 is a top view of an illustrative electronic device with a forward-facing camera in accordance with an embodiment.

FIG. 3 is a top view of device 10 in an illustrative configuration in which device 10 includes an optical system with a double-folded optical path. As shown in FIG. 3, device 10 of FIG. 3 may include user display 14. User display 14 has an array of pixels facing eye box 20 and displays an image that is viewable from a user's eye in eye box 20 through lens (optical system) 16. Device 10 may include a forward-facing camera such as camera 54. Due to the bulk of display 14 and lens 16, camera 54 is located at a distance 2S from eye box 20. Optical system 56' overlaps camera 54 on front side F of device 10. Optical system 56' includes first mirror 84 and second mirror 80 and creates a double-folded light path for incoming real-world image light (see, e.g., incoming light ray 92 from a real-world object such as object 34 of FIG. 1). The double-folded light path virtually shifts the viewpoint of camera 54 to virtual camera position 54V. In this position, the camera has angle-of-view 100 and coincides with eye box 20. During operation of device 10, the user's eye is located in eye box 20. Accordingly, by shifting the viewpoint of camera 54 to position 54V, motion parallax that would otherwise arise as the user's turns the user's head (and device 10) back and forth can be eliminated. This helps the user avoid discomfort from motion parallax effects.

Optical system 56' may use any suitable components for creating a double-folded light path for real-world image light passing to camera 54. In the example of FIG. 3, optical system 56' has first mirror 84 and second mirror 80. Mirror 84 is a partial mirror (sometimes referred to as a partially reflective mirror or half-silvered mirror) and reflects some light (e.g., 50%) and transmits some light (e.g., 50%). Mirror 80 is a reflective polarizer that is configured to transmit light of a first polarization (e.g., light that is linearly polarized along the X axis of FIG. 3) and that is configured to reflect light of a second polarization (e.g., light that is linearly polarized along the Y axis of FIG. 3). Mirror 84 may be covered with circular polarizer 86. Circular polarizer 86 has linear polarizer 88 and has quarter wave plate 90 interposed between linear polarizer 88 and mirror 84. Quarter wave plate 82 may be mounted in front of second mirror 84. For example, quarter wave plate 82 may be attached to the front surface of second mirror 80 and may cover the front surface of second mirror 80.

During operation, real-world image light ray 92 passes through circular polarizer 86 and becomes circularly polarized. This circularly polarized ray is transmitted though partially reflective mirror 84 as circularly polarized ray 94 and reaches quarter wave plate 82. Quarter wave plate 82 converts circularly polarized ray 94 to a linear polarization state aligned with the Y axis of FIG. 3, so that mirror (reflective polarizer) 80 reflects ray 94. The reflected version of ray 94 passes in outward direction Z through quarter wave plate 82 and becomes circularly polarized ray 96. Circularly polarized ray 96 reflects off of mirror 84 in the—Z direction as circularly polarized ray 98. The circular polarization of ray 98 is opposite to that of ray 94 (e.g., if ray 94 is right circularly polarized, ray 98 will be left circularly polarized). As a result, when circularly polarized ray 98 passes through quarter wave plate 82, circularly polarized ray 98 will become linearly polarized along an axis (along the X axis in this example) that is orthogonal to the linear polarization axis of ray 94 after ray 94 passed through quarter wave plate 82. After being converted to the linearly polarized state by passing through wave plate 82, ray 98 will have a linear polarization orientation that is aligned with the pass axis of reflective polarizer 80 and will therefore reach camera 54.

As shown in FIG. 3, mirrors 84 and 80 of optical system 56' are separated by a distance S. Because of the double reflections experienced by the incoming real-world light as this light reflects from mirrors 80 and 84 before reaching camera 54, the position of camera 54 and therefore the viewpoint of camera 54 is virtually shifted by distance 2S to position 54V, which coincides (overlaps) eye box 20 (e.g., virtual camera position 54V and the position of eye box 20 are the same).

Figure 4:
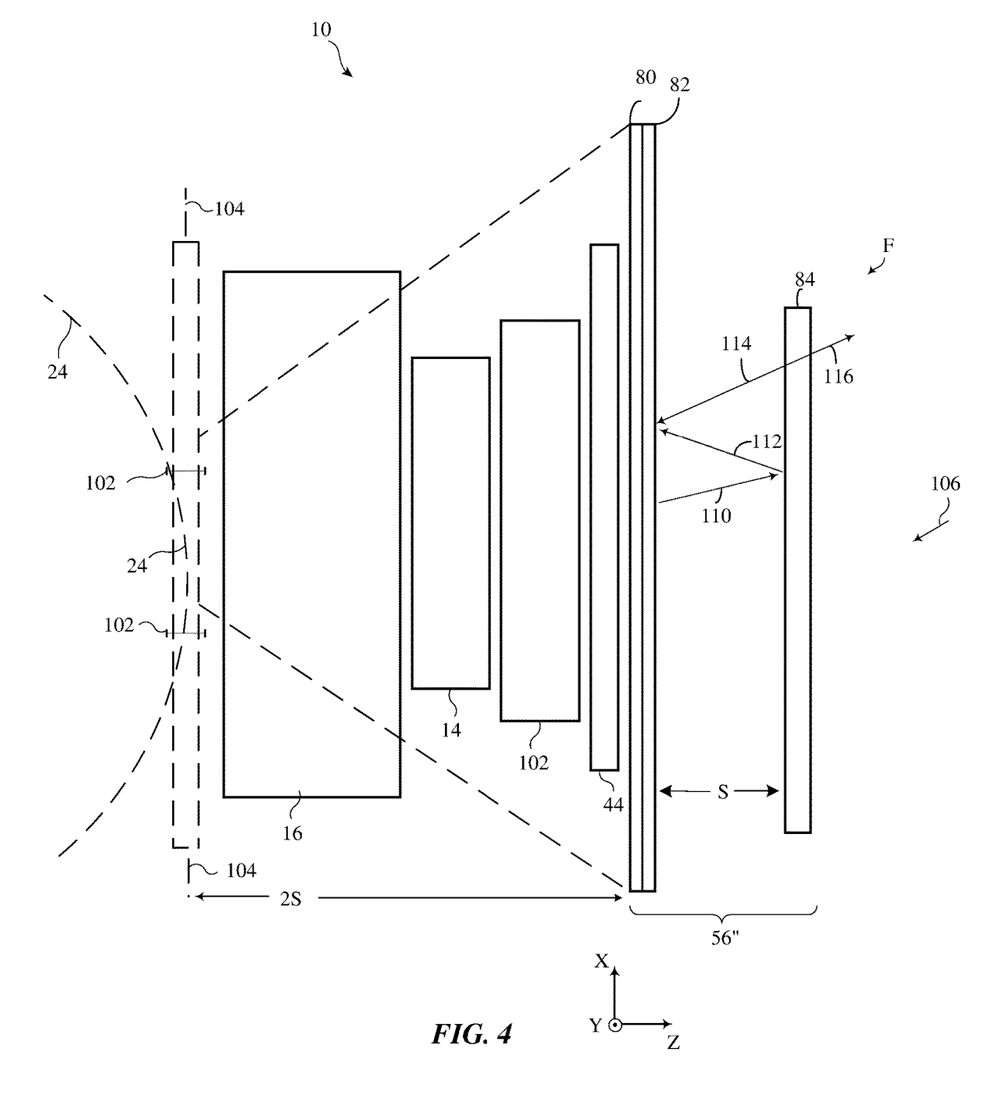
FIG. 4 is a top view of an illustrative electronic device with a forward-facing externally viewable display in accordance with an embodiment.

In the example of FIG. 4, device 10 includes forward-facing (external) display 44. Display 44 has an array of outwardly facing pixels and may be viewed through optical system 56" by an external observer who is viewing device 10 and user 24 in direction 106. As shown by components 102 in FIG. 4, device 10 may include electrical components, a fan, and other components (see, e.g., control circuitry 40 and input-output devices 42 of FIG. 2). The surface of the face of user's head 24 lies in plane 104 and eye boxes 102 lie in plane 104. Due to the presence of lens 16, display 14, and components 102, external display 44 is separated from plane 104 and eye boxes 102 by distance 2S.

As with optical system 56' of FIG. 3, optical system 56" of FIG. 4 has first mirror 84 and second mirror 80. Circular polarizer 86 of FIG. 3 may, if desired, be omitted from system 56". First mirror 84 may be a partially reflective (half-silvered) mirror and second mirror 80 may be a reflective polarizer with a pass axis aligned with the X axis of FIG. 4 and a reflection axis aligned with the Y axis of FIG. 4. During operation, the pixels of display 44 emit light. This emitted light is linearly polarized (along the X axis) by passing through the reflective polarizer of second mirror 80 and is converted to circularly polarized light (ray 110) by passing through quarter wave plate 82. Circularly polarized light such as ray 112 is reflected in the—Z direction by mirror 84. After passing through quarter wave plate 82, the circularly polarized ray 112 is converted to linearly polarized light aligned with the Y axis (e.g., with a polarization orientation that is orthogonal to the polarization orientation of emitted display light after passing though second mirror 80). This Y-polarized light is therefore reflected from second mirror 80 in direction Z. After being reflected by mirror 80 and passing through quarter wave plate 82, this light (see, e.g., light ray 114) will pass through partially reflective mirror 84 (see, e.g., ray 116).

Mirrors 80 and 84 are separated by distance S. Because of the double reflections experienced by the light of an image displayed by external display 44 as this light reflects from mirrors 84 and 80 before exiting optical system 56" as light 116 for observing by an observer who is looking at device 10 in direction 106, the position of external display 44 is virtually shifted by distance 2S to plane 104. The location of plane 104 is shared with the surface of the user's face on head 24 and eye boxes 20. By virtually shifting the position of display 44 so that the apparent position of display 44 to external observers is aligned with the user's face and is aligned with eye boxes 20, parallax in the displayed face image or other image on display 44 due to changes in the angle of view of the external viewer viewing display 44 will be eliminated (i.e., the image on display 44 can contain facial features and other visual elements that appear to rest directly at the outer surface of the user's head, rather than appearing at a distance 2S in front of the user's head). This can make the displayed face image more lifelike and pleasing to view because it appears as if the displayed face image is part of the user's real face.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment

A physical environment or real-world environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with. real objects (that is, physical articles from the physical environment or representations thereof). For example, a system may account for movements so that a virtual tree appears stationery with respect to the physical ground.

Examples of mixed realities include augmented reality and augmented virtuality.

Augmented reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. An electronic device, comprising:
a housing;
head-mounted support structures coupled to the housing;
a lens in the housing;
a display in the housing, wherein the display comprises an array of pixels and is configured to present an image to an eye box through the lens;
a camera in the housing that has a camera viewpoint; and
an optical system in the housing that overlaps the camera, wherein the optical system has a double-folded light path that virtually shifts the camera viewpoint to a position that coincides with the eye box, wherein the array of pixels is interposed between the virtually shifted camera viewpoint and the camera, wherein at least a portion of the array of pixels is within a field of view of the virtually shifted camera viewpoint, and wherein the camera is a forward-facing camera that is configured to capture images through the optical system.

2. The electronic device defined in claim 1 wherein the optical system comprises:

a partially reflective mirror.

3. The electronic device defined in claim 2 wherein the optical system further comprises a reflective polarizer that is configured to pass light with a first linear polarization and that is configured to reflect light with a second linear polarization that is orthogonal to the first linear polarization.

4. The electronic device defined in claim 3 wherein the optical system further comprises a wave plate interposed between the reflective polarizer and the partially reflective mirror.

5. The electronic device defined in claim 4 wherein the wave plate comprises a quarter wave plate.

6. The electronic device defined in claim wherein the partially reflective mirror and the reflective polarizer are separated by a given distance and wherein the double-folded light path virtually shifts the camera viewpoint by twice the given distance.

7. The electronic device defined in claim 6 wherein the optical system further comprises a circular polarizer, wherein the partially reflective mirror is interposed between the circular polarizer and the quarter wave plate.

8. The electronic device defined in claim 1 further comprising an external display on the housing.

9. An electronic device, comprising:

a housing;

head-mounted support structures coupled to the housing;

a lens in the housing;

a user display in the housing that is configured to present an image to an eye box through the lens, wherein the user display comprises an array of pixels;

an externally viewable display supported by the housing wherein the externally viewable display is at a first location spaced apart from the eye box; and an optical system supported by the housing that overlaps the externally viewable display, wherein the optical system has a double-folded light path that virtually shifts the externally viewable display toward the eye box to a second location that coincides with the eye box, and wherein the array of pixels of the user display is interposed between the first location and the second location.

10. The electronic device defined in claim 9 wherein the lens and the array of pixels of the user display are interposed between the externally viewable display and the eye box.

11. The electronic device defined in claim wherein the optical system comprises a reflective polarizer that is configured to pass light with a first linear polarization and that is configured to reflect light with a second linear polarization that is orthogonal to the first linear polarization.

12. The electronic device defined in claim 11 wherein the optical system further comprises:

a partially reflective mirror.

13. The electronic device defined in claim 12 wherein the optical system further comprises a wave plate interposed between the reflective polarizer and the partially reflective mirror.

14. The electronic device defined in claim 13 wherein the wave plate comprises a quarter wave plate.

15. The electronic device defined in claim 14 wherein the partially reflective mirror and the reflective polarizer are separated by a given distance and wherein the double-folded light path virtually shifts the externally viewable display by twice the given distance.

16. An electronic device, comprising:

a housing;

head-mounted support structures coupled to the housing;

an internally-viewable display mounted in the housing, wherein the internally-viewable display comprises an array of pixels;

a lens in the housing through which an image is viewable from an eye box;

an optical component in the housing; and an optical system in the housing at a first location that has a double-folded light path that virtually shifts the optical component toward the eye box from the first location to a second location, wherein the array of pixels is interposed between the first location and the second location, and wherein the optical component is interposed between the optical system and internally-viewable display.

17. The electronic device defined in claim 16 wherein the optical system comprises a reflective polarizer and a partially reflective mirror that are separated by a given distance and wherein the double-folded light path is configured to shift the optical component toward the eye box by twice the given distance.

18. The electronic device defined in claim 17 wherein the optical component comprises a camera.

19. The electronic device defined in claim 17 wherein the optical component comprises an externally viewable display.

\* \* \* \* \*